July 14, 1936.  J. S. WILSON ET AL  2,047,503
HOLD-DOWN DEVICE FOR VEHICLES OR OTHER ARTICLES
Filed Jan. 19, 1934  6 Sheets-Sheet 2
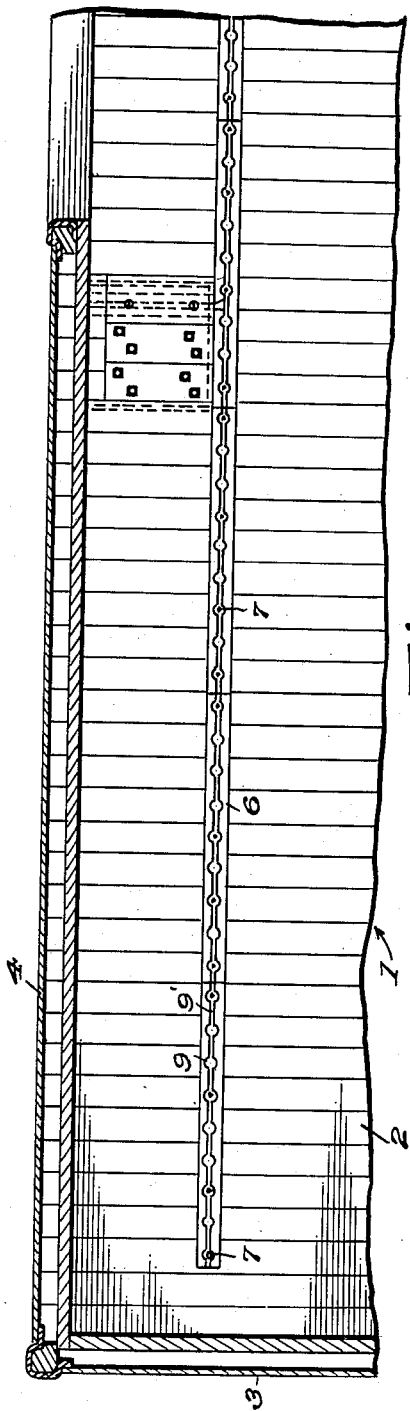
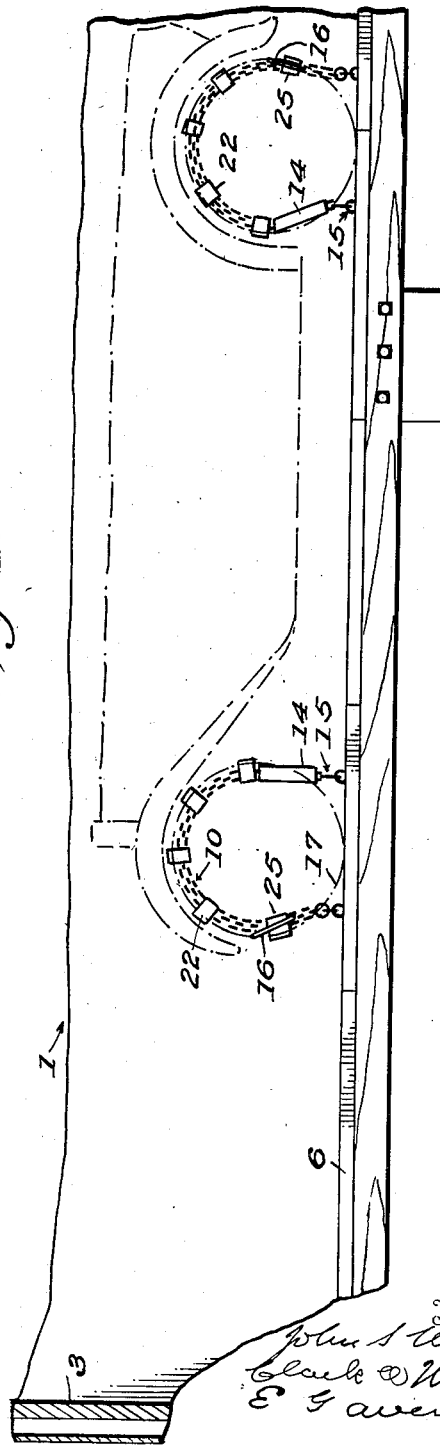

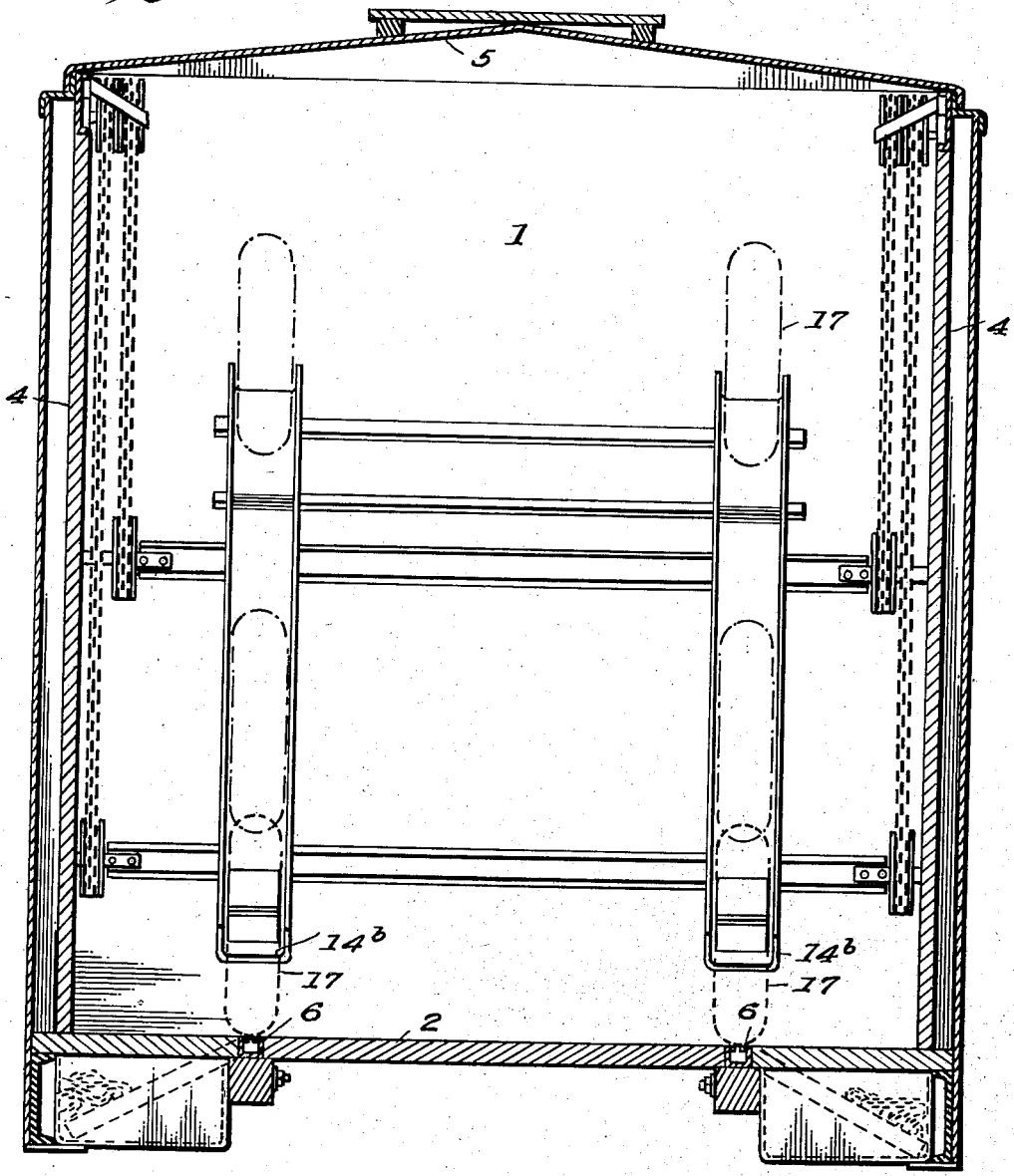

July 14, 1936.　　J. S. WILSON ET AL　　2,047,503
HOLD-DOWN DEVICE FOR VEHICLES OR OTHER ARTICLES
Filed Jan. 19, 1934　　6 Sheets-Sheet 3

July 14, 1936. J. S. WILSON ET AL 2,047,503
HOLD-DOWN DEVICE FOR VEHICLES OR OTHER ARTICLES
Filed Jan. 19, 1934 6 Sheets-Sheet 4
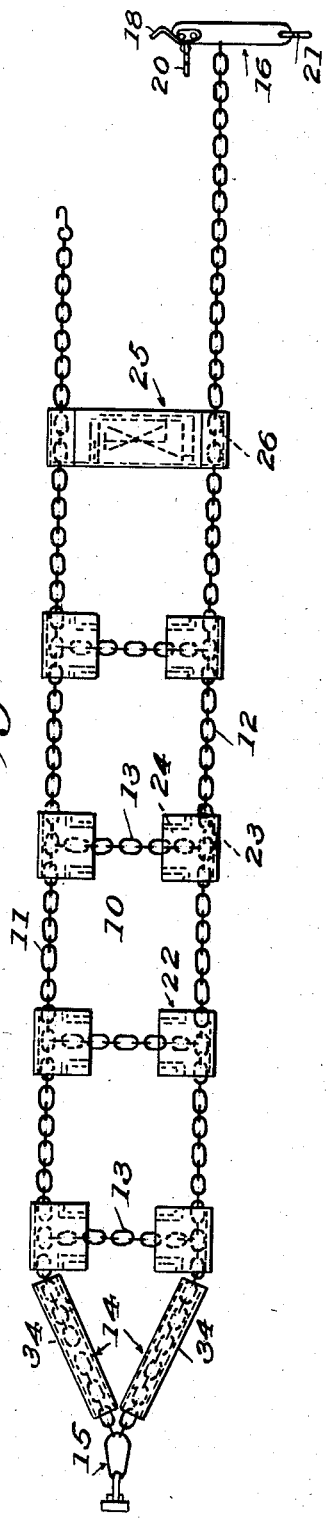
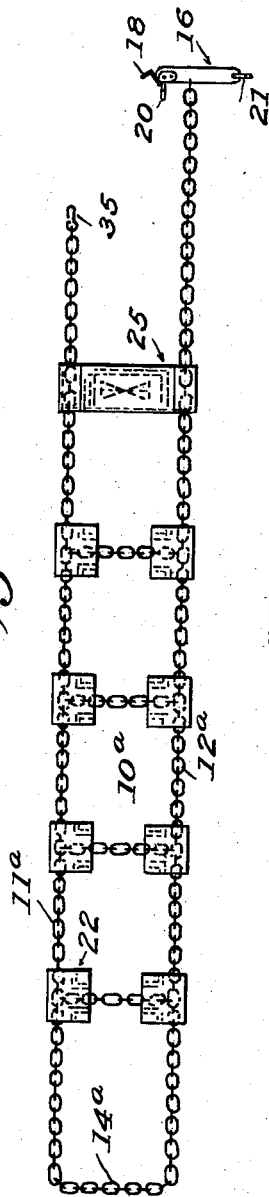
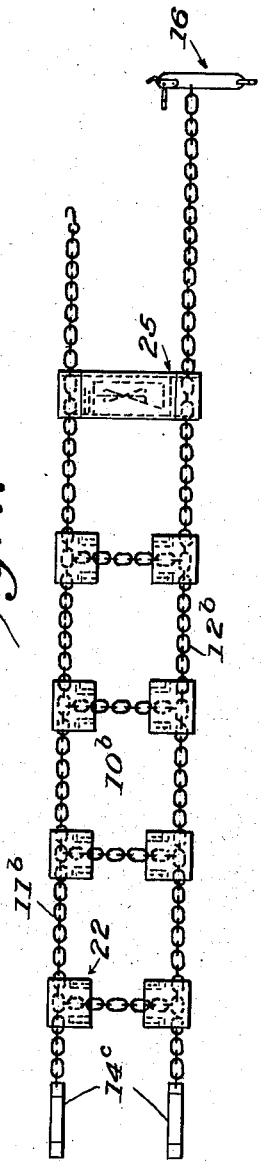

July 14, 1936.    J. S. WILSON ET AL    2,047,503
HOLD-DOWN DEVICE FOR VEHICLES OR OTHER ARTICLES
Filed Jan. 19, 1934    6 Sheets-Sheet 5
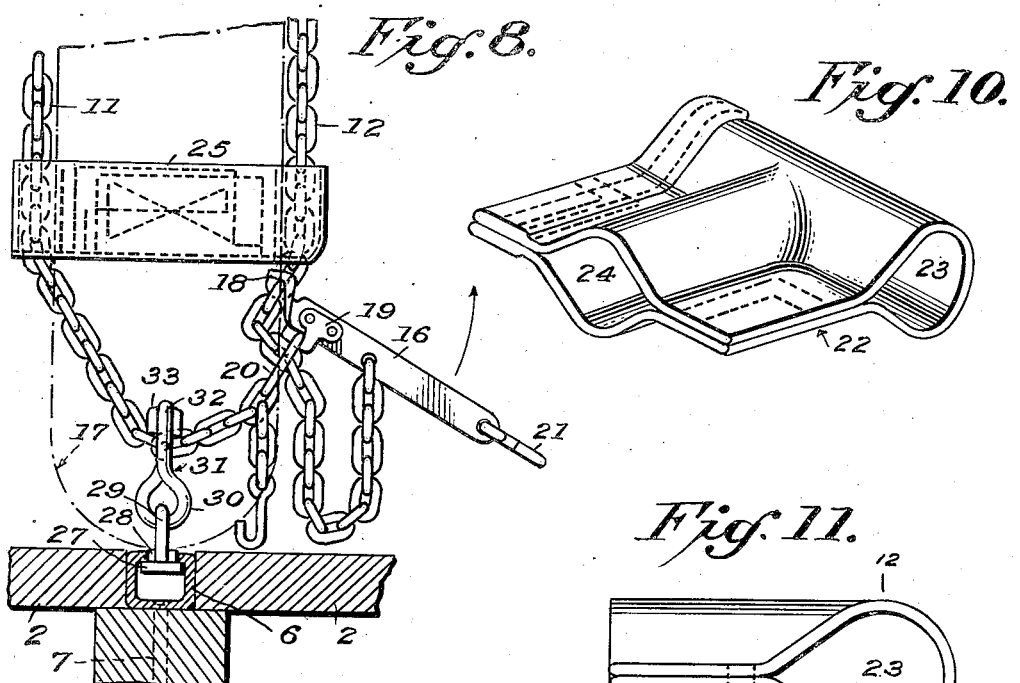
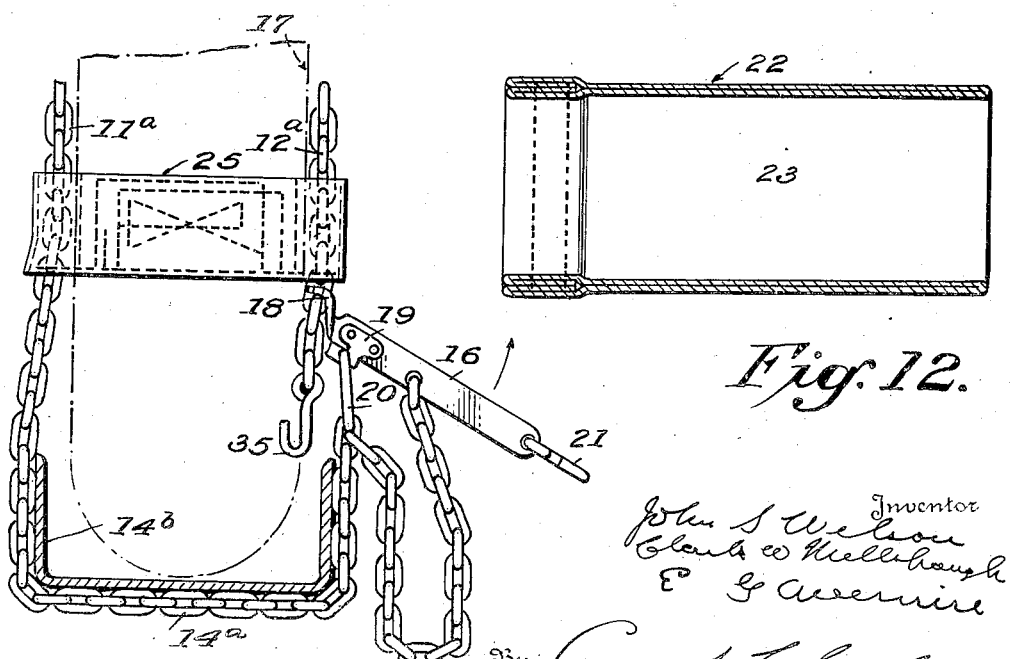

July 14, 1936.   J. S. WILSON ET AL   2,047,503
HOLD-DOWN DEVICE FOR VEHICLES OR OTHER ARTICLES
Filed Jan. 19, 1934   6 Sheets-Sheet 6

Patented July 14, 1936

2,047,503

UNITED STATES PATENT OFFICE 2,047,503

HOLD-DOWN DEVICE FOR VEHICLES OR OTHER ARTICLES

John S. Wilson and Clark W. Millspaugh, Detroit, Mich., and Edwin G. Overmire, Yonkers, N. Y., assignors to The New York Central Railroad Company, a corporation of New York Application January 19, 1934, Serial No. 707,392

5 Claims. (Cl. 248—119)

This application is a continuation in part of our prior application, Serial No. 598,053, filed March 10, 1932.

The present invention relates to holddown chains for use in anchoring the wheels of automobiles to the floors of automobile transportation cars or to automobile supporting racks or runway frames therein.

One object of the invention is to provide a simple, reliable and efficient construction of holddown chain which embodies novel means for tensioning and fastening the same to firmly engage and hold a wheel in position.

Another object of the invention is to provide means upon the chain for guarding and protecting a wheel tire from chafing or other injury by the portions of the chain or the chain tensioning and fastening means.

Still another object of the invention is to provide a holddown chain which is adapted for use with equal efficiency in slightly different forms in connection with floor anchor members or the channeled tracks or runways of auto supporting frames or racks.

With these and other objects in view, the invention consists of the features of construction, combination and arrangement of parts, hereinafter fully described and claimed, reference being had to the accompanying drawings, in which:—

Fig. 1 is a vertical transverse section through a portion of an automobile transportation car embodying channeled anchor guide tracks in its floor for anchoring an automobile to the floor.

Fig. 2 is a sectional plan view through the car at one side of its center showing the arrangement of one of the anchor guide rails.

Fig. 3 is a vertical longitudinal section through the car showing the use of the holddown chains for anchoring an automobile to the floor.

Fig. 5 is a plan view of the holddown chain for anchoring an automobile to a car floor.

Figs. 6 and 7 are, respectively, similar views of front and rear holddown chains for anchoring a car to a supporting frame or rack.

Fig. 8 is an end elevation showing a floor chain applied to a wheel and the fastening and tensioning means arranged for a tensioning and fastening action.

Fig. 9 is a similar view of a rack chain arranged to tension the chain and fasten the wheel to the channeled runway of a rack.

Figs. 10, 11 and 12 are, respectively, a perspective view, an end view and a section on line 12—12 of Fig. 11 through one of the chain boots.

Figure 19:
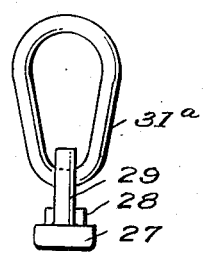
Figs. 19 and 20 are similar views showing the use of the same anchor member with a different form of link.
Figure 20:
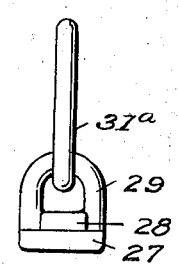
Figure 21:
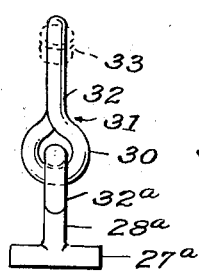
Figs. 21 and 22 are similar views showing the use of the link shown in Figs. 17 and 18 with a different form of anchor member.
Figure 22:
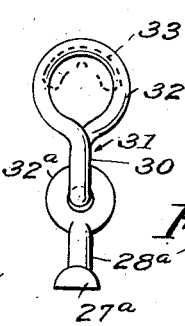
Figure 23:
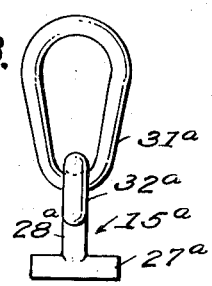
Figure 24:
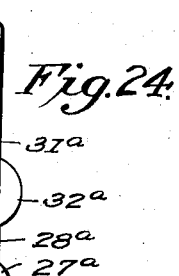

Figs 23 and 24 are similar views showing the use of the link chain in Figs. 19 and 20 with the anchor member shown in Figs. 21 and 22.

Figure 4:
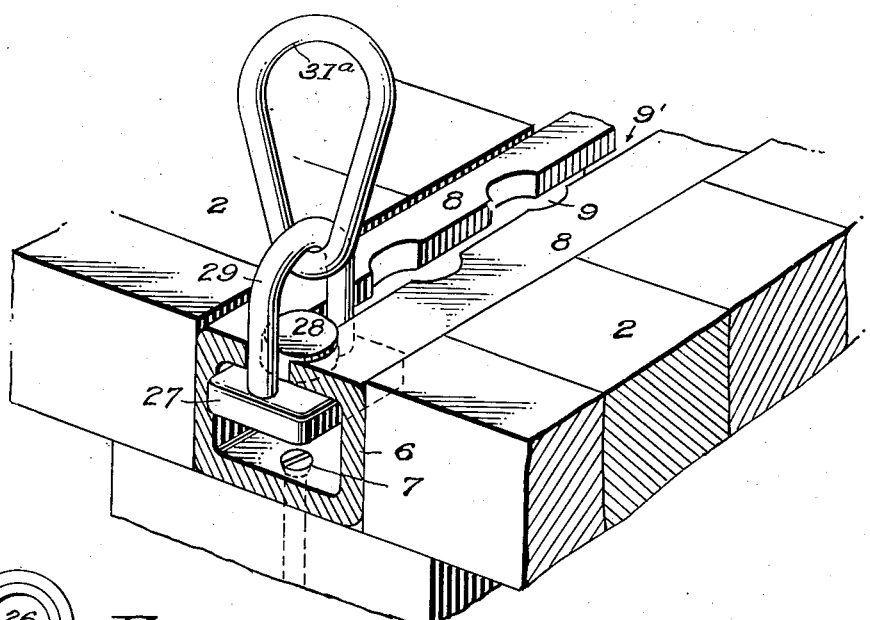
Fig. 4 is a sectional perspective view on an enlarged scale showing clearly the construction of a guide track and an anchor block interlocked therewith.
Figure 13:
Figs. 13 and 14 are, respectively, an end view, and a plan view of one of the adjustable cross straps at the tension end of the holddown chain.
Figure 14:
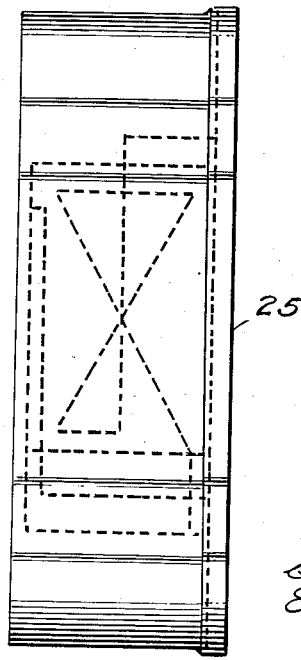
Figure 25:
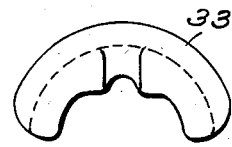
Figure 26:
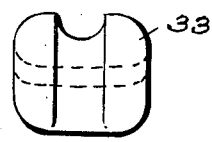

Figs. 25 and 26 are side and end views of the connection link bearing saddle as it appears before application.

Referring now more particularly to the drawings, I designates a freight car of ordinary general construction including a floor 2, end walls 3, one of which is shown, a pair of side walls 4 and a roof 5 of suitable type. In the floor 2 are located a pair of spaced longitudinally extending guide, holder or track rails 6, each of which as shown in the present instance is of substantially C form in cross section and is preferably arranged to extend in practice from end to end of the floor. These rails are embedded in the floor so that their slotted or open top sides are disposed substantially flush with the upper surface of the floor. The rails are firmly secured in position by bolts or other suitable fastenings 7 and the upper spaced, slot-forming walls 8 of each rail are provided in their inner opposed edges, along the entire length of the rail with registering pairs of teeth, seat notches or recesses 9 opening directly into the guide slot 9' disposed between said recessed edges.

The tracks or rails 6 are provided for the use in conjunction therewith of holddown devices, such as floor chains adapted to engage and hold the wheels of an automobile or other vehicle against movement relative to the car floor, which chains are provided with anchoring members for adjustable interlocking engagement with said tracks or rails 6. In such cars vehicle supporting frames or racks may also be employed for holding vehicles elevated above the floor surface against movement relative to the car. Our present invention provides holddown chains for use in conjunction with both floor rails and supporting frames or racks and which embody novel and improved features for the purpose. The rack chains hereinafter described may be used, for example, in connection with supporting frames or racks of the construction disclosed in our prior application Serial No. 598,053, as well as other types of vehicle supporting devices of this character.

Figs. 5 and 8 show a floor chain 10, Figs. 6 and 9 a front rack chain 10a, and Fig. 7 a rear rack chain 10b, embodying the novel features of our invention. These chains are of the same general construction but differ specifically to adapt them for their several purposes or specifically different applications, as hereinafter fully described.

The chain 10 comprises a chain assembly of a pair of longitudinal chains 11 and 12 and cross chains 13 uniting said longitudinal chains at regular intervals. At one end the chains 11 and 12 are connected to joiner chains or links 14 which connect both longitudinal chains to an anchoring member 15 which is adapted to adjustably connect such end of the chain with a track or rail 6. The chain 12 is longer than the chain 11 and at the opposite end of the chain assembly the end of the longer chain 12 has attached thereto a tensioning and fastening lever or member 16 which is adapted for adjustable engagement with the links of the adjacent end of the shorter chain 11 to hold the chain assembly applied about the tire of a vehicle wheel 17 and in connection with a second anchoring member 15 which holds the secured ends of the chain assembly adjustably connected with the rail or track 6.

In applying the chain 10 for use, the chain assembly is draped over the upper portion of the wheel, as shown in Fig. 3, after the anchor member 15 connected to the links 14 at one end of the chain assembly has been fitted in the track 6, and then the opposite free end of the short chain 11 is passed through a link connection of another anchor member 15 applied to the track 6 and the lever 16 attached to the free end of the longer chain then manipulated to tension or draw the chain assembly about the wheel and to fasten the wheel securely in position and bound tightly down against the floor.

Figure 15:
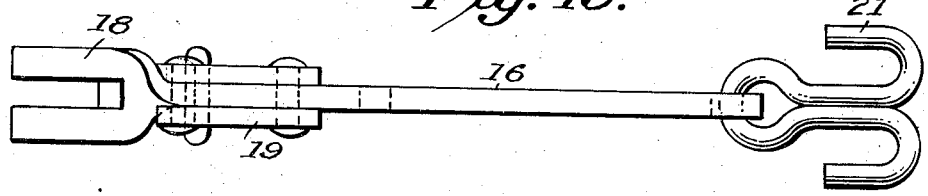
Figs. 15 and 16 are views of the tensioning and fastening lever.
Figure 16:
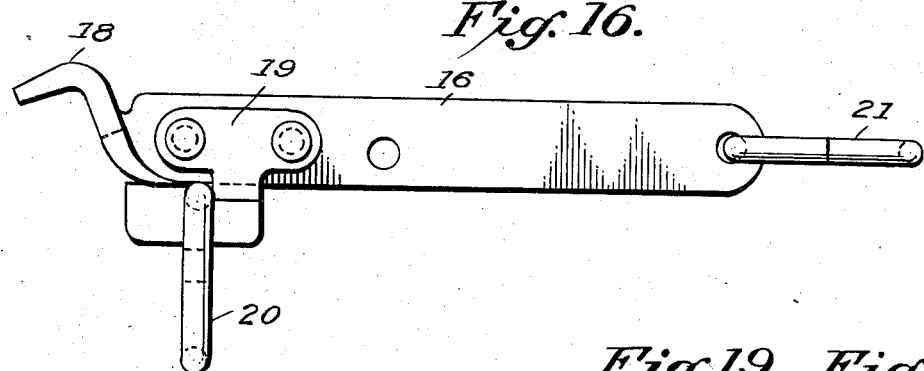

The construction of the lever 16 is shown fully in detail in Figs. 15 and 16. As shown in these figures the lever 16 consists of a flat metal bar secured intermediately of its ends to a terminal link of the chain 12 and quarter twisted and suitably formed at one end to provide a forked engaging hook or claw 18, and attached to such end of the chain is a clip or hook 19 by means of which the lever is connected with a coupling or straining ring or link 20 at or near the terminus of the free end of the short chain 11. The construction is thus such that, as shown in Fig. 8, the free end of the chain 11 may be passed through a connection link of the associated anchor member 29 and engaged by the link 20 with the hook 19 of the lever 16, so that after the chain assembly is fitted upon the wheel and permanently adjusted to clamping position, the hook or claw 18 of the lever 16 may be engaged with a proper link of chain 12 and the lever then swung upwardly on the hook 18 as a pivot and as indicated by the arrow in Fig. 8, to exert a tensioning pull on both chains 11 and 12 of the chain assembly to tension the chain so as to hold the wheel down tight against the floor. In this operation the lever is brought to a substantially vertical position in which its upper or free end lies alongside the adjacent side of the wheel and at a point above the coupling point to engage a relatively elevated portion of the chain 12. At its free end the lever is provided with a double or forked fastening hook 21 which, when the lever is in tensioning and fastening position, may be engaged with a link of the chain 12 to hold the lever securely in such position. With this arrangement it is obvious that by simply disconnecting the fastening hook from the chain 12 and swinging the lever downward to disconnect its hook 18 from the chain 12, and link 20 from chain 11, the chain assembly may be released in a substantially instantaneous manner to free the wheel from anchoring engagement with the car floor.

Fig. 3 of the drawings shows two floor chains 10 of the construction above described as applied for use for holding the front and rear wheels at one side of a vehicle anchored to a track 6 in the floor to secure the vehicle at such side against movement in the car. In practice the front and rear wheels of the vehicle at the opposite side of the car are fastened by similar chains in like manner to the other track 6 so that all four wheels of the vehicle will be anchored to the floor to effectually obviate any liability of the vehicle shifting in the car during transportation.

In order to adapt the chains 10 to be employed for a tight binding action upon the tires of vehicle wheels without injury either to the tires or the wheels, we provide each chain 10 with novel means for preventing portions of the chain at the points of bearing from chafing or otherwise injuring the tire and wheel. The means employed for this purpose comprises boots 22 of duck, canvas or other suitable strong, durable and comparatively flexible material, one of which engages each chain 11 and 12 at its points of connection with the cross chains 13, the boots covering the chains 11, 12 and 13 in the area of their junction points in such manner as to lie between the same and the engaged surfaces of the tire to serve as protectors, whereby direct contact between the chains and the tire is avoided and chafing or other injury to the tire prevented. As shown particularly in Figs. 10, 11 and 12, each of these boots preferably consists of a body of fabric of the indicated character which is doubled upon itself at the point forming one side of the boot, the free edges of the fabric being turned inwardly between the plies of fabric at the point forming the other side of the boot, and the plies being united by stitching or otherwise so as to form between the plies a T-shaped channel, through one portion 23 of which the chain 11 or 12 passes and through the other portion 24 of which the chain 13 passes whereby the boot is properly applied to the chain elements to serve as a protector or guard in the manner stated and to hold it from shifting or displacement on the chain. In addition to the boots 22 which are fixed in position on the chain, we also provide a cross protector strip or guard 25, formed of similar material folded upon itself to provide a protector of suitable thickness or a sufficient number of plies for the purpose, which plies are stitched or otherwise suitably united and the strip constructed to provide at its ends guide loops or passages 26 slidably engaging the chains 11 and 12 at their free ends. The purpose of this strip is to form a transverse guard or protector at the point where the free ends of the chains are drawn taut and fastened to prevent direct contact between the same and the tire, as well as to form a guard between the tire and the lever 16 when the latter is in fastened position to prevent the same from marring or otherwise injuring the tire or adjacent portion of the wheel. By slidably mounting the protector 25 on the chains, this protector is made adjustable to properly serve its purpose in the application of the chain to wheel tires of different diameters. By the use of the shoes and guard strip injury to tires of wheels caused by holddown chains of ordinary type are avoided and a tighter clamping action may be secured without injuring or marring the wheel in any particular.

Figure 17:
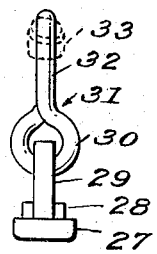
Figs. 17 and 18 are side and end views of one form of anchor member and anchor link for anchoring a floor chain to a floor track.
Figure 18:
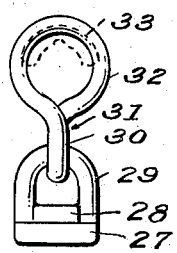

The anchoring members employed for adjustably connecting the holddown chains with the tracks 6 may be of any suitable construction. In Figs. 20 to 26, inclusive, we have shown types of anchoring members which are preferably employed. Fig. 8 shows an anchor member 15 which comprises an anchor block or body 27 which is adapted to fit within the track rail 6 so as to be both longitudinally and vertically movable therein. The block is of less depth than the height of the track so that it may be raised and lowered to bring a locking stud or projection 28 thereon into or out of engagement with a pair of the locking teeth or recesses 9 in the track to lock the block against movement or to release it for movement and adjustment longitudinally of the track. The block is provided with a loop-shaped shank or eye 29 extending upwardly therefrom and which is engaged by one eye 30 of a connection link 31 having at its opposite end an eye 32 through which the end of the chain 11 is adapted to pass, the link and its eyes being formed by suitably doubling and quarter twisting a rod of suitable length and diameter upon itself, as will be readily understood. It will thus be apparent that by the use of anchor members of this type, the ends of a holddown chain may be locked in position for holding a wheel in place in a ready and secure manner, but also in such manner that a released chain may be adjusted for use at any point in the length of the track. Preferably in the use of a connection link 31 of this form, the eye 32 of the link is provided with an arcuate wear saddle or bearing 33 which is grooved for engagement with the top of the link 32 and with the chain passing therethrough and forms a surface of materially increased extent to sustain the wear and strain falling upon the link. This element 33 is preferably secured to the link by forging or welding so as to make it a part of the link itself. In lieu of the link 31 a connection link 31a of pear shape may be employed in conjunction with the block 27 as shown in Figs. 19 and 20, this form of the connection link enabling a link sufficiently wide and of proper strength and wear thickness to be furnished. Figs. 23 and 24 show a modified construction of anchor member employed in connection with a connection link of the type shown in Figs. 19 and 20, while Figs. 21 and 22 show the use of an anchor member of the modified type shown in Figs. 23 and 24 with a connection link of the type shown in Figs. 17 and 18, indicating their interexchangeability to serve specifically different purposes. The anchor member 15a disclosed in Figs. 23 and 24 comprises a T-shaped member embodying a head 27a adapted to interlock with the teeth or seat notches in the track and a shank 28a terminating in an eye 32a for engagement with the connection link. This type of anchor member 15a may, if desired, be used in connection with a guide track in which locking teeth are formed upon the undersides of the opposed top walls of the track, as will be readily understood.

In practice, we also preferably provide the connection links 14 of the chain assembly 10 with protecting sheaths or coverings 34 of the same material as the boots and cross strip to prevent the links from directly contacting with and injuring the tire or wheel of the vehicle.

The floor holddown chains and anchoring devices disclosed herein may be employed whenever desired in conjunction with storage receptacles of the character disclosed in an application for patent executed by us of even date herewith.

In Figs. 6 and 9 the chain assembly 10a designed for use as a front rack chain is substantially the same in construction as the floor chain 10, differing therefrom mainly in specific particulars. As shown, the short and long chain members 11a and 12a instead of being coupled at one end to connection links 14, like the chain 10, are united by a cross chain portion 14a which is designed in practice, as shown in Fig. 9 to be extended beneath the channeled runway 14b of a vehicle supporting frame or rack, to anchor such end of the front rack chain thereto. The other end of the chain assembly will be similarly applied to the channeled runway by passing the free end of the link chain member 12a beneath the runway and engaging the tensioning and fastening lever with a link of the short chain member 11a for a tensioning and fastening action of the character previously described. Preferably a loose chain hook 35 is employed in this construction at the free end of the chain member 11a, whereby such end of the chain 11a, after the lever has been fastened thereto, may be engaged with the chain 11a above the point of connection of the fastening hook 21 therewith, so that such end of the chain may be looped and secured in position to prevent it from buckling loose and striking the wheel from movements imparted thereto in the travel of the car.

The rear rack chain 10b shown in Fig. 7 may be similar in construction at its lever end to the chain structure 10a, but its chain members 11b and 12b are connected at the opposite end of the chain assembly to joiner links 14c, for attaching such end of the chain assembly to a wheel chock or the like applied to the vehicle supporting frame or rack. The structure in this particular may be similar to that shown, for example, in my prior application Serial No. 598,053, above referred to. Any other suitable mode of connecting this end of the chain, either fixedly or adjustable with the vehicle supporting frame or rack may be employed.

From the foregoing description, taken in connection with the drawings, the construction and mode of use of our improved holddown chains for securing the wheels of a vehicle to the floor of a freight car or to the channeled tracks or runways of a vehicle supporting frame or rack mounted within a freight car will be readily understood by those versed in the art without a further and extended description, and it will be seen that the invention provides a simple, reliable and efficient construction of holddown chain which, by slight variations of construction, may be employed for floor or rack use to hold the wheels of a vehicle firmly fastened against any liability of the vehicle becoming loose or being allowed to have movement in the travel of the freight car. Also it will be seen that our invention provides a holddown chain which may be used in connection with different types or forms of adjustable floor anchor members as occasion may require in employing the chains in connection with floor tracks varying in construction from each other. Other uses and advantages of the invention will be understood and appreciated by those versed in the art without specific recitation.

While the structures disclosed are preferred, it will, of course, be understood that changes in the form, construction and arrangement of parts may be varied from those disclosed, within the scope of the appended claims without departing from the spirit or sacrificing any of the advantages of the invention.

What we claim is:

1. A holddown chain for anchoring rubber tired vehicle wheels or other objects to a floor or other supporting foundation comprising longitudinal chain members and a series of cross chain members connecting the same at spaced intervals, means connected with the longitudinal chain members at the ends of the chain for fastening the chain about the wheel tire and to the foundation support, guard shoes at the point of intersection of the longitudinal and cross chains for engagement with the sides of the tire to protect the tire from injury thereby, and a guard member extending between the longitudinal chains beyond the adjacent cross chain at one end of the chain assembly.

2. A holddown chain for anchoring rubber tired vehicle wheels or other objects to a floor or other supporting foundation comprising longitudinal chain members and a series of cross chain members connecting the same at spaced intervals, means connected with the longitudinal chain members at the ends of the chain for fastening the chain about the wheel tire and to the foundation support, guard shoes at the point of intersection of the longitudinal and cross chains for engagement with the sides of the tire to protect the tire from injury thereby, and a guard member extending between the longitudinal chains beyond the adjacent cross chain at one end of the chain assembly, said guard member being adjustable along said longitudinal chains.

3. A holddown chain for anchoring rubber tired vehicle wheels or other objects to a floor or other supporting foundation comprising longitudinal chain members connected at intervals by cross chain members, means for connecting the chain assembly at one end thereof to the foundation support, fastening means at the other end of the chain for drawing the assembly taut about the wheel tire and fastening the assembly to the foundation support, guard shoes on the chain assembly at the points of junction of the longitudinal and cross chains for engagement with the sides of the wheel tire to protect the tire from injury by contact therewith, and a guard tire at the latter named end of the chain assembly to protect the wheel against injury by such end of the chain and the fastening means.

4. A holddown chain for anchoring rubber tired vehicle wheels or other objects to a floor or other foundation support comprising longitudinal chain members and cross chain members connecting the same at intervals, connection links coupling the longitudinal chains at one end to the foundation support, fabric protectors about said links, fastening means at the other end of the chain for drawing the chain tightly about the wheel and securing the chain to the foundation support, protector pads on the longitudinal and cross chains at their points of intersection to engage the sides of the tire and protect the tire against injury thereby, and a transverse protector pad extending between the longitudinal chain members at the second named end of the chain to protect the wheel from injury by the fastening means.

5. A holddown chain of the character described for securing rubber tired vehicle wheels to a foundation support comprising longitudinal chain members and transverse chain members, means at one end of the chain assembly for anchoring the same to a foundation support, adjusting and fastening means at the other end of the chain assembly for varying the effective length of the chain assembly and anchoring the same to the foundation support, flexible protector pads at the points of intersection of the longitudinal and transverse chain members for engagement with the sides of the wheel tire to protect the same from injury, flexible tire engaging protector pads upon the longitudinal chain members at the first-named end of the chain, and a flexible tire engaging protector pad extending transversely between the longitudinal chain members at the second-named end of the chain and adjustable on said chain members to different positions to compensate for adjustments of said adjusting and fastening means.

JOHN S. WILSON.
CLARK W. MILLSPAUGH.
EDWIN G. OVERMIRE.